(12) United States Patent
Brooks

(10) Patent No.: US 8,919,214 B2
(45) Date of Patent: Dec. 30, 2014

(54) ALIGNMENT SLEEVE AND SEAL

(75) Inventor: Craig Raymond Brooks, Harrison Township, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 325 days.

(21) Appl. No.: 13/476,674

(22) Filed: May 21, 2012

(65) Prior Publication Data

US 2013/0305877 A1     Nov. 21, 2013

(51) Int. Cl.
    *F16H 37/00*     (2006.01)

(52) U.S. Cl.
    USPC ........................................ 74/15.84; 180/53.1

(58) Field of Classification Search
    USPC ................. 74/11, 15.66, 15.69, 15.84, 15.86; 403/288
    See application file for complete search history.

(56) References Cited

U.S. PATENT DOCUMENTS 3,513,712 A * 5/1970 Crooks et al. .................. 74/15.2

\* cited by examiner

*Primary Examiner* — Paul N Dickson
*Assistant Examiner* — Robert A Coker

(57) ABSTRACT

A transmission and power take-off unit assembly is provided including a transmission, a power take-off unit, and an alignment sleeve and seal assembly. The transmission and power take-off housing both include a bearing surface and locating surface that are machined by a tool having two coaxial cutting wheels. The alignment sleeve enables tighter tolerances for improved concentricity between the bearing surface and locating surface.

15 Claims, 2 Drawing Sheets

ALIGNMENT SLEEVE AND SEAL

FIELD

The invention relates generally to mechanical assemblies, and more particularly to a mechanical assembly aid and seal.

BACKGROUND

The statements in this section merely provide background information related to the present disclosure and may or may not constitute prior art.

A transmission interface transfers torque via a rotating shaft from the transmission to another mechanical unit such as a transfer case or a power take-off unit. Typically, each of the transmission unit and, for example, the power take-off unit, include a housing and at least one shaft that are interconnected at the interface. While the shafts for each unit are supported within the particular unit by a bearing, the housings of each unit also interact through a pilot feature on one of the housings and a receiving bore on the other housing. The locating surface of the pilot feature is on the outside diameter. The machining operation that forms the outside diameter of the pilot feature is a separate operation than the machining operation that forms the inside diameter of the surface that supports the bearing of the shaft. As a result, the probability for bore centerline misalignment is increased. Consequences of bore misalignment include excessive side loading resulting in premature bearing failure and excessive shaft wear resulting in shaft failure.

While current interface designs have been sufficient for typical applications, the need for a new and improved interface configuration is required to minimize the loading effects created by non-concentric shafts. Loading effects can be realized as short bearing life and excessive noise and vibration among other customer dissatisfiers. Accordingly, there is a need for an improved transmission interface.

SUMMARY

A transmission and power take-off unit assembly is provided including a transmission, a power take-off unit, and an alignment sleeve and seal assembly. The transmission includes a first housing, a first output member, and a first bearing. The first housing includes a first bore in which the first output member is disposed coaxially with the first bore. The first bore has a first bearing surface and a first locating surface. The first bearing is disposed on the first bearing surface and rotatably supports the first output member. The power take-off unit includes a second housing disposed adjacent to the first housing, a first input member, and a second bearing. The second housing includes a second bore that is coaxial with the first bore and in which the first input member is disposed coaxially with the second bore. The second bore has a second bearing surface and a second locating surface. The second bearing is disposed on the second bearing surface and rotatably supports the first input member. The first output member is interconnected for common rotation with the first input member. The alignment sleeve and seal assembly includes an annular sleeve portion and a seal portion disposed on an outer diameter surface of the sleeve portion. The alignment sleeve and seal assembly is disposed such that the outer diameter surface of the sleeve portion is in contact with each of the first and second bores and the seal portion is disposed in a seal channel formed between the first and second housings.

In another example of the present invention, the transmission further includes a first shaft seal. The first housing further includes a first seal surface. The first shaft seal is disposed between the second output shaft and the first seal surface.

In yet another example of the present invention, the power take-off unit further includes a second shaft seal. The second housing includes a second seal surface. The second shaft seal is disposed between the second input shaft and the second seal surface.

In yet another example of the present invention, the first output member is a first sleeve shaft having a first shaft bore and the transmission further includes a second output member disposed in the inner bore of and coaxial to the first output member.

In yet another example of the present invention, the first input member is a second sleeve shaft having a second shaft bore and the power take-off unit further includes a second input member disposed in the inner bore and coaxial to the first input member.

In yet another example of the present invention, the first sleeve shaft is coupled for common rotation with the second sleeve shaft.

In yet another example of the present invention, a transmission and power take-off assembly is prepared by a process is provided with the process including the steps of providing a transmission housing and a power take-off housing, providing a first cutting tool having two coaxial cutting wheels, machining a first bearing surface and a second locating surface of the transmission housing using the second cutting tool, providing a second cutting tool having two coaxial cutting wheels, machining a second bearing surface and a second locating surface of the power take-off housing using the second cutting tool, providing an alignment sleeve and seal assembly having an annular sleeve portion and a seal portion disposed on an outer diameter surface of the sleeve portion, and wherein the alignment sleeve and seal assembly is disposed such that the outer diameter surface of the sleeve portion is in contact with each of the first and second locating surfaces of the transmission housing and the power take-off housing.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figure 1:
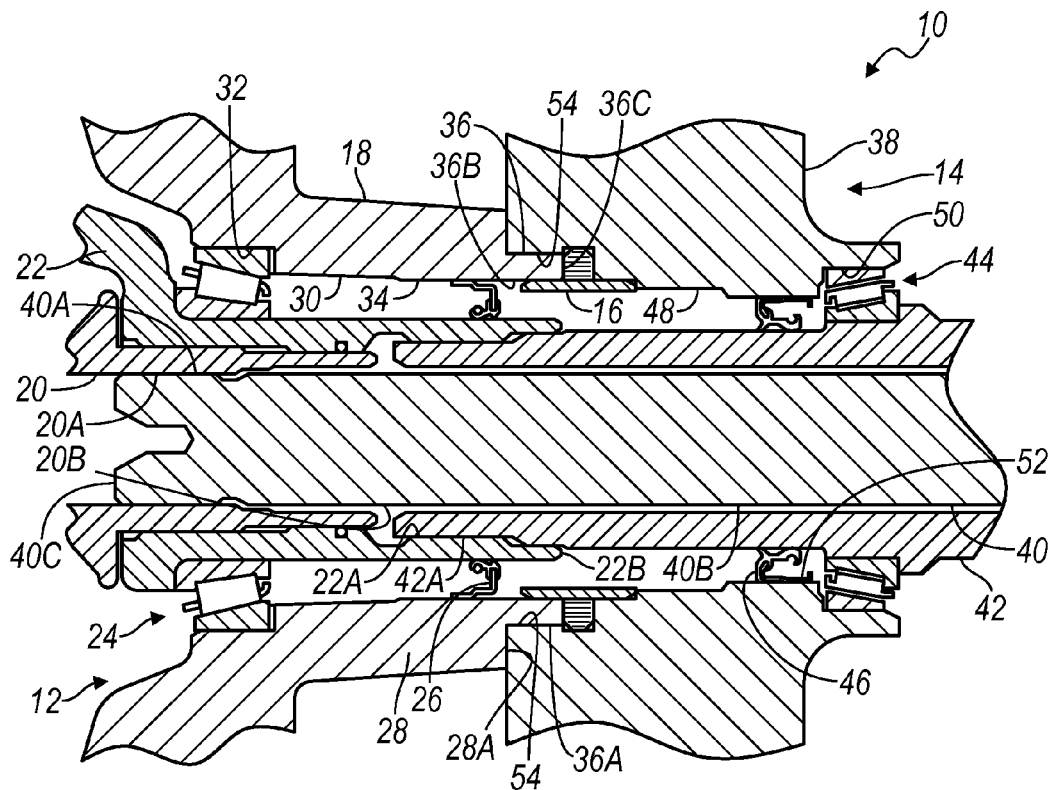
FIG. 1 is a partial cross-sectional view of an example of a transmission unit and power take-off unit interface.

Referring to the drawings, wherein like reference numbers refer to like components, in FIG. 1 an example of a transmission and power take-off unit interface 10 is illustrated and will now be explained. The transmission and power take-off unit interface 10 includes a transmission 12, a power take-off unit (PTU) 14, and an alignment sleeve and seal 16. Alternatively, an example of the present invention may include another mechanical device in place of the PTU 14 such as a transfer case, etc. The transmission 12 includes a transmission housing 18, a first and a second output shafts or members 20, 22, a bearing 24, and a seal 26. The transmission housing 18 has an annular protrusion 28, an inner bore 30, and a locating portion 36. The inner bore 30 includes a machined bearing surface 32, and a seal surface 34. The bearing surface 32 is disposed interior in the transmission housing 18 from the seal surface 34 which is disposed proximate an exterior end 28A of the annular protrusion 28. The locating portion 36 is disposed on the exterior end 28A of the annular protrusion 28 and has a radially facing outer diameter surface 36A, a radially facing inner diameter surface 36B, and an axially facing sealing surface 36C that connects the outer and inner diameter surfaces 36A, 36B.

The first and second output member 20, 22 are arranged coaxially with the inner bore 30 with each output member 20, 22 having a splined inner surface 20A, 22A. The bearing 24 is disposed on the bearing surface 32 and rotatably supports the second output member 22. The second output member 22 is a sleeve shaft and is disposed on an exterior surface 20B of the first output member 20, rotatably supports the first output member 20, and has an end 22B that extends beyond an end 20B of the first output member 20. In another embodiment of the present invention, a transmission having a single output member or more than two output members may be employed without departing from the scope of the disclosure.

The PTU 14 includes a housing 38, a first and a second input shafts or members 40, 42, a bearing 44, and a seal 46. The housing 38 includes a bore 48 having a machined bearing surface 50, a seal surface 52, and a locating portion 54. The bearing surface 50 is disposed interior in the housing 48 from the seal surface 52. The locating portion 54 is disposed at an end 48A of the bore 48 and has a first inner diameter surface 54A, a radially inward facing sealing surface 54B, an axially facing sealing surface 54C, and a second inner diameter surface 54D.

The first and second input members 40, 42 are arranged coaxially with and disposed in the bore 48 with each input member 40, 42 having a splined outer surface 40A, 42A. The bearing 44 is disposed on the bearing surface 50 and rotatably supports the second input member 42. The second input member 42 is a sleeve shaft and is disposed such that a minimal gap separates the interior surface 42B of the second input member 42 and an exterior surface 40B of the first input member 40. The first input member 40 has a first end 40C that extends beyond an end 42C of the second input member 42.

As the transmission 12 and the PTU 14 are assembled, the splined outer surface 40A of the first input member 40 of the PTU 14 mates with the splined inner surface 20A of the first output member 20 of the transmission 12, the splined outer surface 42A of the second input member 42 of the PTU 14 mates with the splined inner surface 22A of the second output member 22 of the transmission, and the outer diameter surface 36B of the locating portion 36 of the transmission 14 is mated with the inner diameter surface 54A of the locating portion 54 of the PTU housing 38.

Figure 2:
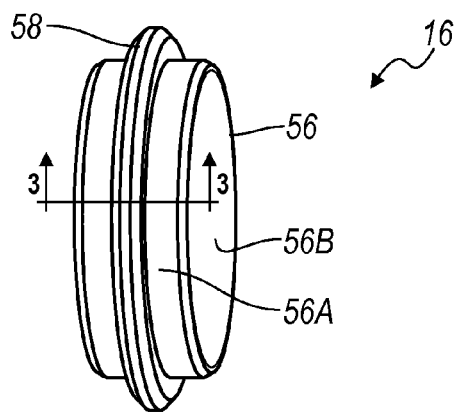
FIG. 2 is a perspective view of an alignment sleeve and seal.
Figure 3:
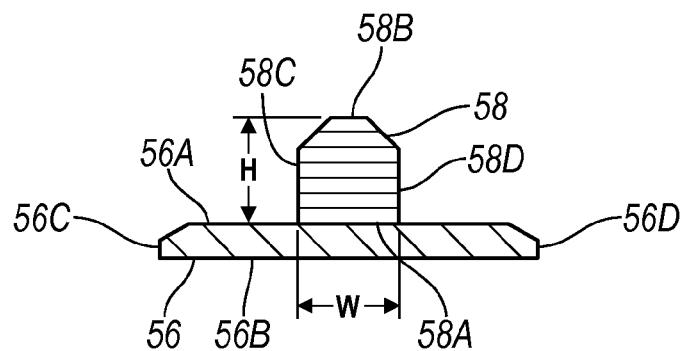
FIG. 3 is a partially cut-away view of an alignment sleeve and seal.

Referring now to FIGS. 2 and 3, an example of the alignment sleeve and seal 16 is illustrated and will now be described. The alignment sleeve and seal 16 include an alignment sleeve or cylinder 56 and an annular seal 58. The sleeve has an outer surface 56A, an inner surface 56B, a first end, 56C and a second end 56D. Each end 56C, 56D includes a chamfer such that the outer surface 56A tapers diametrically inward toward the inner surface 56B. The seal 58 includes an inner surface 58A, an outer surface 58B, and a first and second axially facing sides 58C, 58D. The seal 58 has a cross-section in which the overall width or axial length W is approximately equal to the overall height or radial thickness H. The sides 58C, 58D of the seal 58 taper from near the inner surface 58A narrowing towards the outer surface 58B. However, alternative cross sections of the seal 58 can be contemplated without departing from the scope of the invention. The seal 58 is disposed such that the inner surface 58A of the seal 58 is in contact with the outer surface 56A of the sleeve 56 approximately at the midpoint of the sleeve between the first end 56C and second end 56D.

Figure 4:
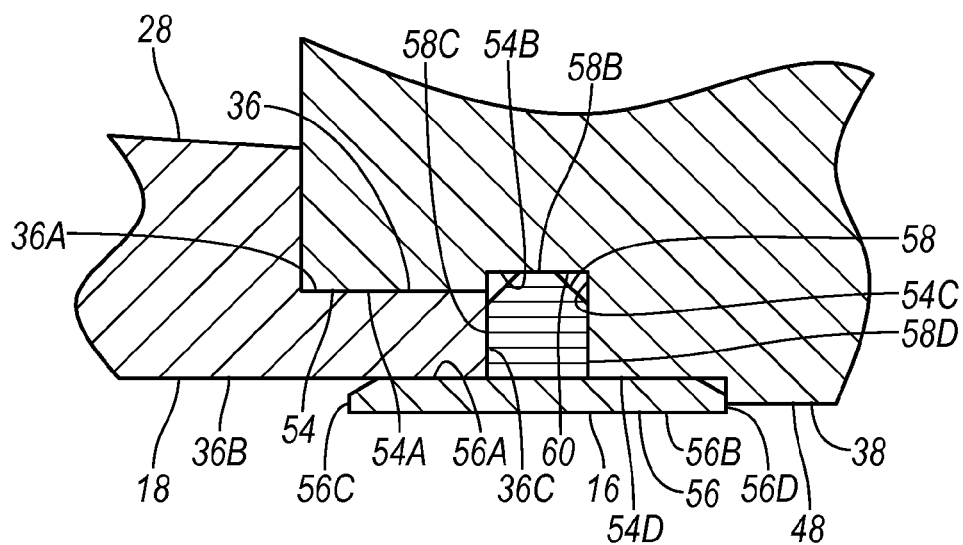
FIG. 4 is a magnified cross sectional view of the transmission unit and power take-off unit interface.

While referring back to FIG. 1, FIG. 4 illustrates a magnified cross-sectional view of the alignment sleeve and seal 16 and its location in the interface 10. The alignment sleeve and seal 16 is shown disposed adjacent to and between the locating portion 36 of the transmission housing 18 and the locating portion 54 of the PTU housing 38. More specifically, the outer diameter surface 36A of the locating portion 36 of the transmission housing 18 is in contact with the first inner diameter surface 54A of the PTU housing 38. The outer diameter 56A of the alignment sleeve 56 is disposed partially on the inner diameter 36B of the locating portion 36 of the transmission housing 18 and partially on the inner diameter 54D of the locating portion 54 of the PTU housing 38. The assembly of the transmission housing 18 and the PTU housing 38 forms a seal channel 60 in which is disposed the seal 58 of the alignment sleeve and seal 16. The seal channel 60 is formed by the sealing surface 36C of the locating portion 36 of the transmission housing, the radially inward facing sealing surface 54B of the locating portion 54 of the PTU housing 38, and the axially facing sealing surface 54C of the locating portion 54 of the PTU housing 38.

The process by which the bearing surfaces 32, 50 and the surfaces 36A, 54D of the locating portions 36, 54 are machined provides the designer with the ability to specify tighter diametrical tolerances. This is important because the bearing surfaces 32, 50 are used to locate the bearings 24, 44 which in turn locate the second input and output members 22, 42. The tighter tolerances provides for improved concentricity between the surfaces 32, 50, 36A, 54D and therefore reduces spin loses and decreases side loading on the input and output members 20, 22, 40, 42 and therefore the bearings 24, 44. This is accomplished by providing a single operation and a single tool that includes cutting elements for each of the bearing surface 32 and the surface 36A of the transmission housing 18. Also, the same concept is practiced on the PTU housing 38 by providing a single operation and a single tool that includes cutting elements for each bearing surface 50 and the surface 54D of the PTU housing 38.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission and power take-off unit assembly comprising:
   a transmission having a housing, a first output member, and a bearing, and wherein the housing includes a first bore in which the first output member is disposed coaxially with the first bore, the first bore has a bearing surface and a locating surface, and the bearing is disposed on the bearing surface and rotatably supports the first output member;

a power take-off unit having a housing disposed adjacent to the housing of the transmission, a first input member, and a bearing, and wherein the housing of the power take-off unit includes a bore that is coaxial with the bore of the transmission and in which the first input member is disposed coaxially with the bore of the power take-off unit, the bore of the power take-off unit has a bearing surface and a locating surface, the bearing of the power take-off unit is disposed on the bearing surface of the power take-off unit and rotatably supports the first input member, and the first output member is interconnected for common rotation with the first input member; and an alignment sleeve and seal assembly having an annular sleeve portion and a seal portion disposed on an outer diameter surface of the sleeve portion, and wherein the alignment sleeve and seal assembly is disposed such that the outer diameter surface of the sleeve portion is in contact with each of the bore of the transmission and the bore of the power take-off unit and the seal portion is disposed in a seal channel formed between the housings of the transmission and power take-off unit.

2. The transmission and power take-off assembly of claim 1 wherein the transmission further includes a shaft seal, the housing of the transmission further includes a seal surface, and the shaft seal is disposed between the first output member and the seal surface.

3. The transmission and power take-off assembly of claim 2 wherein the power take-off unit further includes a shaft seal, the housing of the power take-off includes a seal surface, and the shaft seal is disposed between the first input shaft and the seal surface of the power take-off unit.

4. The transmission and power take-off assembly of claim 1 wherein the first output member is a sleeve shaft having a shaft bore and the transmission further includes a second output member disposed in the shaft bore of and coaxial to the first output member.

5. The transmission and power take-off assembly of claim 4 wherein the first input member is a sleeve shaft having a shaft bore and the power take-off unit further includes a second input member disposed in the shaft bore and coaxial to the first input member.

6. The transmission and power take-off assembly of claim 5 wherein the sleeve shaft of the transmission is coupled for common rotation with the sleeve shaft of the power take-off unit.

7. The transmission and power take-off assembly of claim 6 wherein the bearing of the transmission and the bearing of the power take-off assembly are tapered roller bearings.

8. The transmission and power take-off assembly of claim 1 wherein the seal portion is bonded to the outer diameter surface of the sleeve portion.

9. A transmission and power take-off unit assembly comprising:

a transmission having a housing, a first and a second output member, and a bearing, and wherein the housing of the transmission includes a bore in which the first output member is disposed coaxially with the bore, the bore has a bearing surface and a locating surface, the first output member is a sleeve shaft having a shaft bore, the second output member is disposed in the shaft bore of the first output member, and the bearing is disposed on the bearing surface and rotatably supports the first output member;

a power take-off unit having a housing disposed adjacent to the housing of the transmission, a first and second input member, and a bearing, and wherein the housing includes a bore that is coaxial with the bore of the transmission and in which the first input member is disposed coaxially with the bore of the power take-off unit, the bore has a bearing surface and a locating surface, the bearing is disposed on the bearing surface of the power take-off unit and rotatably supports the first input member, and the first output member is interconnected for common rotation with the first input member; and an alignment sleeve and seal assembly having an annular sleeve portion and a seal portion disposed on an outer diameter surface of the sleeve portion, and wherein the alignment sleeve and seal assembly is disposed such that the outer diameter surface of the sleeve portion is in contact with each of the bores of the transmission and the power take-off unit and the seal portion is disposed in a seal channel formed between the housings of the transmission of the power take-off unit.

10. The transmission and power take-off assembly of claim 9 wherein the transmission further includes a shaft seal, the housing of the transmission further includes a seal surface, and the shaft seal is disposed between the second output member, and the seal surface.

11. The transmission and power take-off assembly of claim 10 wherein the power take-off unit further includes a shaft seal, the housing of the power take-off unit includes a seal surface, and the shaft seal is disposed between the second input member and the seal surface.

12. The transmission and power take-off assembly of claim 11 wherein the first input member is a sleeve shaft having a shaft bore and the second input member is disposed in the shaft bore and coaxial to the first input member.

13. The transmission and power take-off assembly of claim 9 wherein the sleeve shaft of the transmission is coupled for common rotation with the sleeve shaft of the power take-off unit.

14. The transmission and power take-off assembly of claim 9 wherein the bearing of the transmission and the bearing of the power take-off assembly are tapered roller bearings.

15. The transmission and power take-off assembly of claim 9 wherein the seal portion is bonded to the outer diameter surface of the sleeve portion.

\* \* \* \* \*